United States Patent [19]

Young et al.

[11] Patent Number: 5,098,667
[45] Date of Patent: Mar. 24, 1992

[54] PARTICULATE FLOW CONTROL

[75] Inventors: Richard K. Young; Pat Rooney, both of Bartlesville, Okla.

[73] Assignee: Phillips Petroleum Company, Bartlesville, Okla.

[21] Appl. No.: 347,704

[22] Filed: May 5, 1989

[51] Int. Cl.$^5$ .................. G01N 21/00; G05D 7/00; B65G 53/66

[52] U.S. Cl. .................. 422/111; 422/62; 422/110; 137/4; 137/624.15; 406/25

[58] Field of Search .................. 422/111, 62, 110; 137/4, 192, 624.15; 406/124, 19, 23, 24, 25, 31, 32, 146, 197, 109

[56] References Cited

U.S. PATENT DOCUMENTS

| | | | |
|---|---|---|---|
| 3,008,809 | 11/1961 | Martinez | 23/258 |
| 3,257,363 | 6/1966 | Miller et al. | 260/88.2 |
| 3,492,283 | 1/1970 | Miller | 422/110 |
| 3,514,217 | 5/1970 | Reiss | 406/19 |
| 3,846,394 | 11/1974 | Mitacek | 422/131 |
| 3,900,292 | 8/1975 | Fairchild | 422/110 |
| 3,951,604 | 4/1976 | Smith et al. | 23/253 A |
| 4,533,517 | 8/1985 | Hofferber | 422/62 |
| 4,619,901 | 10/1986 | Webb jet al. | 436/55 |
| 4,832,915 | 5/1989 | Messura | 422/111 |

Primary Examiner—Douglas W. Robinson
Assistant Examiner—T. Reardon
Attorney, Agent, or Firm—George E. Bogatie

[57] ABSTRACT

A continuous flow of particulate solids to a reactor is accomplished by first forming a heavy slurry in a storage tank, then transferring the heavy slurry to a mixing tank, where the heavy slurry is diluted to form a dilute slurry of desired density which can be continuously pumped to the reactor. Control of the particulate solids flow to the reactor is accomplished by calculating the flow rate of solid particles contained in the dilute slurry in an on-line computer, and comparing the calculated value to a desired value. The on-line calculation of particulate flow is based on the measured density and flow rate of the dilute slurry, and the predetermined densities of the dry particulate solids and the liquid diluent consituting the dilute slurry. The flow rate of the dilute slurry is continuously manipulated so as to maintain a desired flow rate of solid particles contained in the dilute slurry.

19 Claims, 3 Drawing Sheets

PARTICULATE FLOW CONTROL

This invention relates to control of a reactor. In one aspect it relates to apparatus for controlling flow of a particulate feed to a reactor. In another aspect it relates to a method of establishing continuously controlled flow of particulate material. More specifically, it relates to method and apparatus for controlling flow of particulate solid type catalyst to a polymerization reactor.

In a typical polymerization reaction, monomer, diluent and a dry particulate catalyst are fed to a reactor where the monomer is polymerized. The diluent does not react but the quantity of diluent supplied to the reactor is typically utilized to control solids concentration in the reactor and also to provide a convenient mechanism for introducing the particulate solid catalyst into the reactor.

A mixture of dry solid particulate catalyst and diluent are apportioned in a catalyst storage tank, often called a mud tank, for thorough mixing before being passed in controlled amounts into a reaction vessel for contact with the monomer reactants. Typically catalyst mixtures in a storage tank, which contain proportionally high amounts of solids, are feed to the reactor through a special valve which is generally referred to as a ball check feeder or shot feeder valve. This special ball check valve is charged or filled with a predetermined volume of a mixture of catalyst and diluent when in a first position. Periodically this ball check valve is actuated to a second position and this volume of the mixture is dumped from the valve into the reactor. The ball check valve is then recharged or refilled with the predetermined volume of the mixture in preparation for actuation back to the first position where the second volume of mixture is dumped from the valve into the rector. This sequence of charging, valve actuation and dumping is continued throughout the polymerization reaction.

In the polymerization process the variables which are available for manipulation by control system are generally limited to two variables, i.e., to the monomer feed rate, and the diluent feed rate. It would be desirable to also manipulate the catalyst feed rate in response to a continuously variable control signal. However, due to its intermittent action, the ball check valve which handles the charging of the solid catalyst to the polymerization reactor is not readily adaptable for use with continuously variable control signals such as are utilized for manipulating the diluent feed and the monomer feed.

Accordingly it is an object of this invention to provide a continuous flow of solid catalyst particles to a polymerization reactor wherein the solids flow rate can be manipulated by a continuously variable control signal.

Another object of this invention is to provide method and apparatus for providing improved control of a polymerization reaction.

It is further object of this invention to provide method and apparatus for controlling the flow of dry solid catalyst to a polymerization reactor, wherein the catalyst can be selected from a variety of catalysts which have different densities.

In accordance with the present invention method and apparatus are provided whereby a dilute slurry is formed in a mix tank to provide a source of particulate material from which a continual flow of solid particles can be established. The flow rate of the dilute slurry is continuously manipulated so as to provide a desired flow rate of solid particles contained in the dilute slurry.

In a preferred embodiment, a continuous mass flow of solid catalyst particles to a polymerization reactor is maintained at a desired rate in response to a computed value of the mass flow rate of the solid catalyst particles contained in the dilute slurry. The computed mass flow rate of catalyst particles is based upon "on line" measurements of density and flow rate of the dilute catalyst slurry stream flowing to the reactor, and on predetermined densities of the solid catalyst particles and the liquid diluent constituting the slurry.

Other objects and and advantages of the invention will be apparent from the following detailed description of the invention when read in conjunction with the drawings which are briefly described as follows.

The invention is described in terms of feeding a dry, particulate solid type catalyst to a polymerization reactor wherein the dry catalyst is slurried in a diluent liquid. However, the problem of controlling a flow rate of solids contained in a slurry is broadly applicable to particulate feed systems in general. Therefore the present invention is applicable to any particulate feed system where the flow rate of particulate solids contained in a slurry is to be controlled.

Figure 1:
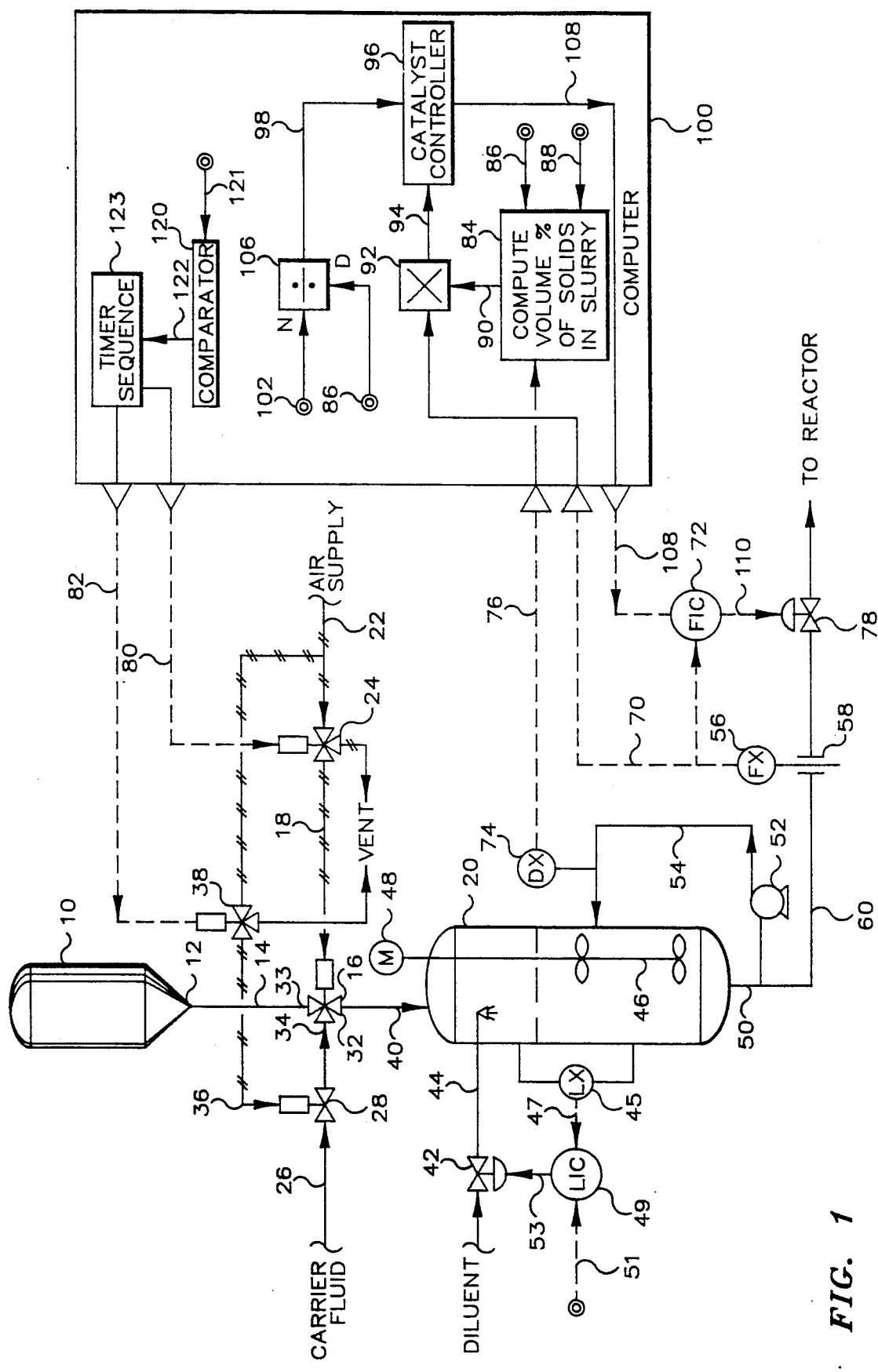
FIG. 1 is a diagrammatic illustration of a catalyst feed system and the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is sometimes utilized to refer to such results. Thus, the term "signal" is not only used to refer to electrical currents or pneumatic pressures but is also used to refer to binary representations of a calculated or measured value.

The controllers shown may utilize the various modes of control such as proportional, proportional-integral, and proportional-intergral-derivative ("PID"). In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1 there is illustrated a catalyst storage vessel, or so called mud tank or pot, 10 which contains a concentrated solid-liquid slurry of a diluent such as isobutane and a particulate catalyst. The slurry in mud tank 10, is referred to as a concentrated or heavy slurry since it contains a proportionally high amount of particulate catalyst solids. The concentrated slurry is fed from an outlet port 12 of mud pot 10 through the combination of conduit 14 and conduit 40 to mix tank 20.

Flow control of the concentrated slurry from the mud pot 10 to the mix tank 20 is accomplished by a piston motor valve 16 which incorporates a measurement and a control element in a single unit. Piston motor valve (PMV) 16, which is operably located between conduit 14 and conduit 40, delivers a fixed volume of concentrated slurry from mud tank 10 for each cycle of operation as will be explained more fully hereinafter.

PMV 16 is actuated by a pneumatic control signal via conduit 18 which connects an air supply from conduit 22 to PMV 16 through electric solenoid valve (ESV) 24. ESV 24 is actuated by control signal 80 from computer 100.

A carrier fluid, such as isobutane or nitrogen, is supplied through conduit 26 to port 34 of PMV 16 through PMV 28. The carrier fluid flushes a measured quantity of slurry through PMV 16 into mix tank 20 via conduit 40. PMV 28 is activated by a pneumatic control signal via conduit 36 which connects an air supply from conduit 22 through ESV 38 to PMV 28. ESV 38 is actuated by control signal 82 from computer 100.

Concentrated slurry flow from mud tank 10 to mix tank 20 is accomplished by the cyclic operation of PMV's 16 and 28 and ESV's 24 and 38 as follows: PMV 16 is open in response to control signal 80 which is output from computer 100 to ESV 24. When ESV 24 and correspondingly PMV 16 are each in an open position a fixed quantity of concentrated slurry flows through a first port 33 of PMV 16 and fills a chamber within PMV 16. After an appropriate time delay to allow the fixed volume of concentrated slurry from mud tank 10 to fall into the chamber within PMV 16, PMV 28 is opened to pass carrier fluid therethrough and the concentrated slurry is flushed through the second port 32 of PMV 16 and into mix tank 20 by the carrier fluid supplied to port 34 to PMV 16. Flow of carrier fluids supplied from conduit 26 to port 34 of PMV 16 is controlled by ESV 28 in response to control signal 82 which is outputted from computer 100 to ESV 38, such that when ESV 38 is in an open position PMV 28 is also in an open position.

Figure 3:
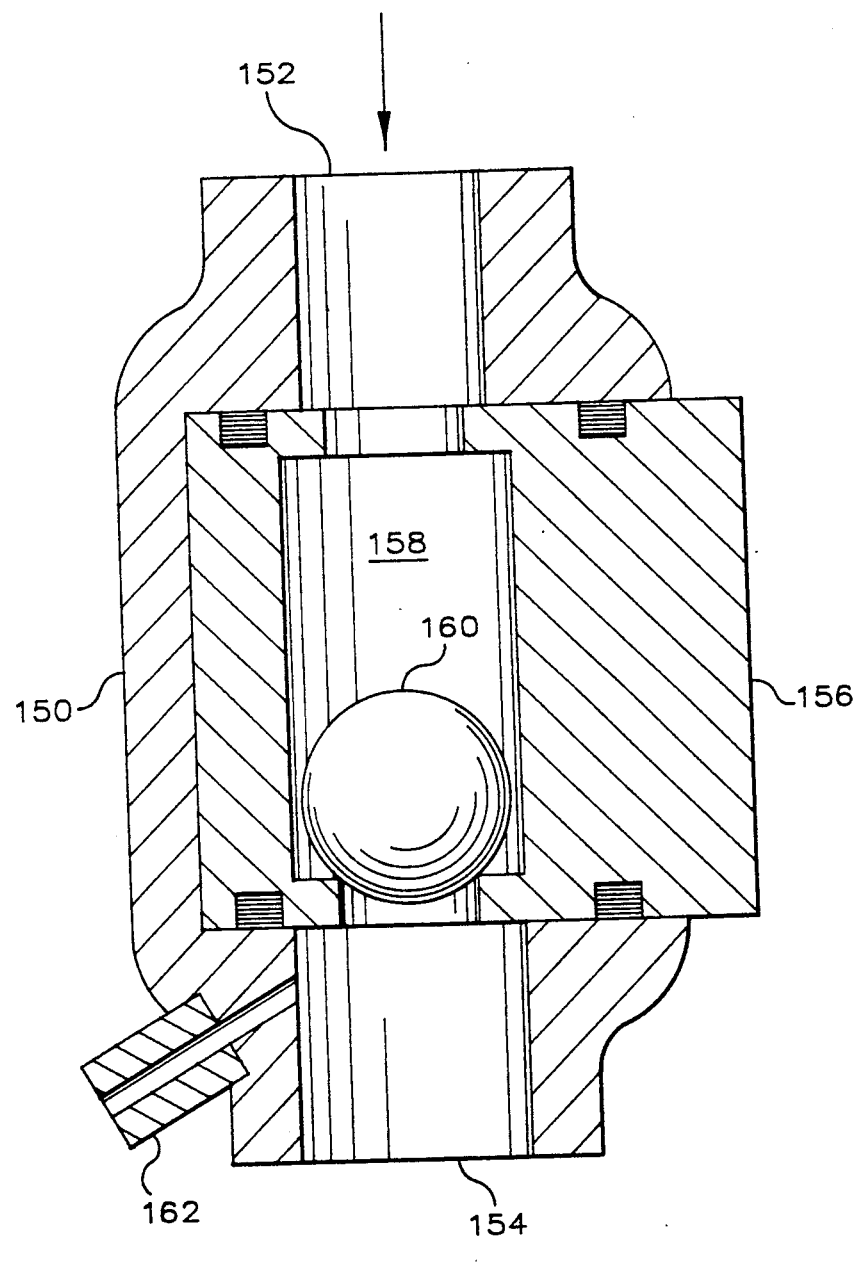
FIG. 3 is a cross section of a ball check feeder valve arrangement.

FIG. 3 illustrates a ball check feeder valve arrangement suitable for utilization in PMV 16. This arrangement includes a body 150, having an inlet 152 and an outlet 154, a member 156, containing a metering chamber 158, which is rotatable within the body 150 for communicating with the inlet and outlet in at least two positions, a ball shaped piston 160, which moves with a reciprocating motion within the chamber 158 as the member 156 is rotated and a port 162, which can be connected for flushing. Details of valve construction and of typical polymerization catalyst handled by the valve may be had by referring to any of several U.S. patents, such as U.S. Pat. No. 3,167,398, U.S. Pat. No. 3,219,208 or U.S. Pat. No. 4,501,286.

A stream of liquid diluent, such as isobutane, is provided to mix tank 20 through control valve 42 which is operably located in conduit 44. The concentrated slurry supplied to mix tank 20 through conduit means 40 is diluted by the diluent supplied through conduit 44 to provide a dilute slurry in mix tank 20.

A level transducer 45 provides an output signal 47 which is representative of the actual level of the dilute slurry in mix tank 20. Signal 47 is provided from level transducer 45 as a process variable input to level controller 49. Set point signal 51 is also provided as an input signal to level controller 49. In response to signals 47 and 51, level controller 49 provides an output signal 53 to control valve 42 which is responsive to the difference between signals 47 and 51. Signal 53 is scaled so as to be representative of the position of control valve 42 required to maintain the actual level in mix tank 20 substantially equal to the desired level represented by set point signal 51. Control valve 42 is manipulated in response to signal 53.

Mix tank 20 is also provided with a stirrer 46 which is driven by a motor 48.

Dilute catalyst slurry is withdrawn from mix tank 20 through conduit 50. A first portion of the slurry withdrawn through conduit 50 is recycled to mixing tank 20 via pump 52 and conduit 54. the remaining dilute catalyst slurry withdrawn from mixing tank 20 is provided through conduit 60 to a polymerization reactor not shown in FIG. 1.

In order to control the above-described catalyst feed system, the computer 100 accepts two measured input signals and four manually entered signals. In response to the input signals, computer 100 provides a continuous output signal 108 to manipulate the mass flow rate of catalyst solids flowing through conduit 60, and additionally the computer provides two discrete or digital type signals 80 and 82 to maintain the actual density of the dilute catalyst slurry in mix tank 20 substantially equal to a desired value.

The development of the continuous control signal 108 to manipulate the flow rate of dilute catalyst slurry through conduit 60 will be described first. Flow transducer 56, in combination with flow sensor 58 which is operably located in conduit 60, provides an output signal 70 which is representative of the flow rate of dilute catalyst slurry through conduit 60. Signal 70 is provided from flow transducer 56 as an input to computer 100 and also as a process variable input to flow controller 72. A gamma density gauge 74, which may be radiation density gauge as describe in Perry's Chemical Engineers Handbook, 5th Edition, Section 22, McGraw-Hill, provides an output signal 76 which is representative of the density of the dilute catalyst slurry flowing through conduit 60. Signal 76 is provided from the density gauge 74 as an input to computer 100. The actual value of the solids concentration in the dilute catalyst slurry flowing through conduit 60 is calculated based on the measured density of the dilute catalyst slurry in mix tank 20, the measured flow rate of the dilute slurry through conduit 60, the predetermined density of the solid catalyst and the predetermined density of the liquid diluent.

Signal 76, which is representative of the actual density of the dilute catalyst slurry supplied to a polymerization reactor through conduit 60, is provided to a "compute volume percent of solids in slurry" computer block 84 in computer 100. The computer block 84 is also provided with manually entered signals 86 and 88 which are respectively representative of the predetermined densities of the dry solid catalyst and the density of the liquid diluent in mix tank 20. In response to these above-described input signals 76, 86, and 88, computer block 84 calculates the volume percent solids in the dilute catalyst slurry in accordance with the formula:

$$\%_{(SO)} = \frac{D_{(SL)} - D_{(LD)}\%_{(LD)}}{D_{(SO)}}$$

where:
$D_{(SL)}$ = density of the slurry,
$D_{(SO)}$ = density of the solid catalyst,
$D_{(LD)}$ = density of the liquid diluent, and
$\%_{(LD)}$ = volume % of liquid diluent in the slurry = $1 - \%_{(SO)}$.

The computer block 84 provides an output signal 90 which is representative of the volume percent of particulate solids in the slurry flowing through conduit 60. Signal 90 is provided from computer block 84 as a first input signal to multiplier block 92 in computer 100. Signal 70, which is representative of the actual flow rate of dilute catalyst slurry flowing through conduit 60, is provided as a second input to multiplier in block 92. Signal 90 is multiplied by signal 70 in multiplier block 92 to establish signal 94 which is representative of the volume flow rate of the solid catalyst flowing through conduit means 60. Signal 94 is provided from multiplier block 92 as a process variable input to catalyst controller block 96 in computer 100. Catalyst controller block 96, which can be PID controller implemented by a computer software routine, is also provided with a set point signal 98, which is representative of the desired volume flow rate of solid catalyst flowing through conduit 60. Signal 98 is based on manually entered signal 102 which is representative of a desired mass flow rate of solid catalyst flowing through conduit 60. Signal 102 is divided by signal 86 in computer block 106, to establish signal 98. Signal 86, which as previously stated, is representative of the predetermined density of the solid catalyst flowing through conduit 60, is manually entered into computer 100.

In response to signals 98 and 94, controller 96 provides an output signal 108 which is responsive to the difference between signals 94 and 98. Signal 108 is scaled to be representative of the flow rate of dilute catalyst slurry flowing through conduit 60 required to maintain a desired mass flow rate of solid catalyst represented by signal 98 substantially equal to the calculated value of solid catalyst mass flow rate represented by signal 94.

Signal 108 is provided from computer 100 as a set point signal to flow controller 72. Flow controller 72 also receives the process variable signal 70 which is representative of the actual flow rate of dilute catalyst slurry flowing through conduit 60. In response to signals 70 and 108, flow controller 72 provides an output signal 110 which is responsive to the difference between signals 70 and 108. Signal 110 is scaled so as to be representative of the position of control valve 78 required to maintain the actual flow rate of dilute catalyst slurry through conduit 60 substantially equal to the desired catalyst mass flow rate represented by signal 108. Control valve 78 is manipulated in response to control signal 110.

Referring now to the discrete or digital type control signals 80 and 82 which are developed to maintain the desired density of the dilute slurry in mixing tank 20, there is illustrated a computer comparator block 120 in computer 100. Signal 76, which as previously stated, is representative of the actual density of the dilute catalyst slurry flowing from mix tank 20 through conduit 60, is provided as a first input to comparator block 120. Comparator block 120 is also provided with a manually entered input signal 121 which is representative of the minimum desired density for the dilute catalyst slurry in mix tank 20. Comparator block 120 provides a digital type output signal 122 which is activated when the actual density of the dilute catalyst slurry in mix tank 20, as represented by signal 76, is less than the desired minimum density for the dilute catalyst slurry represented by signal 121. If desired, a transition of signal 122 can be utilized to initiate the timer sequence, 123 which is illustrated in FIG. 2.

Figure 2:
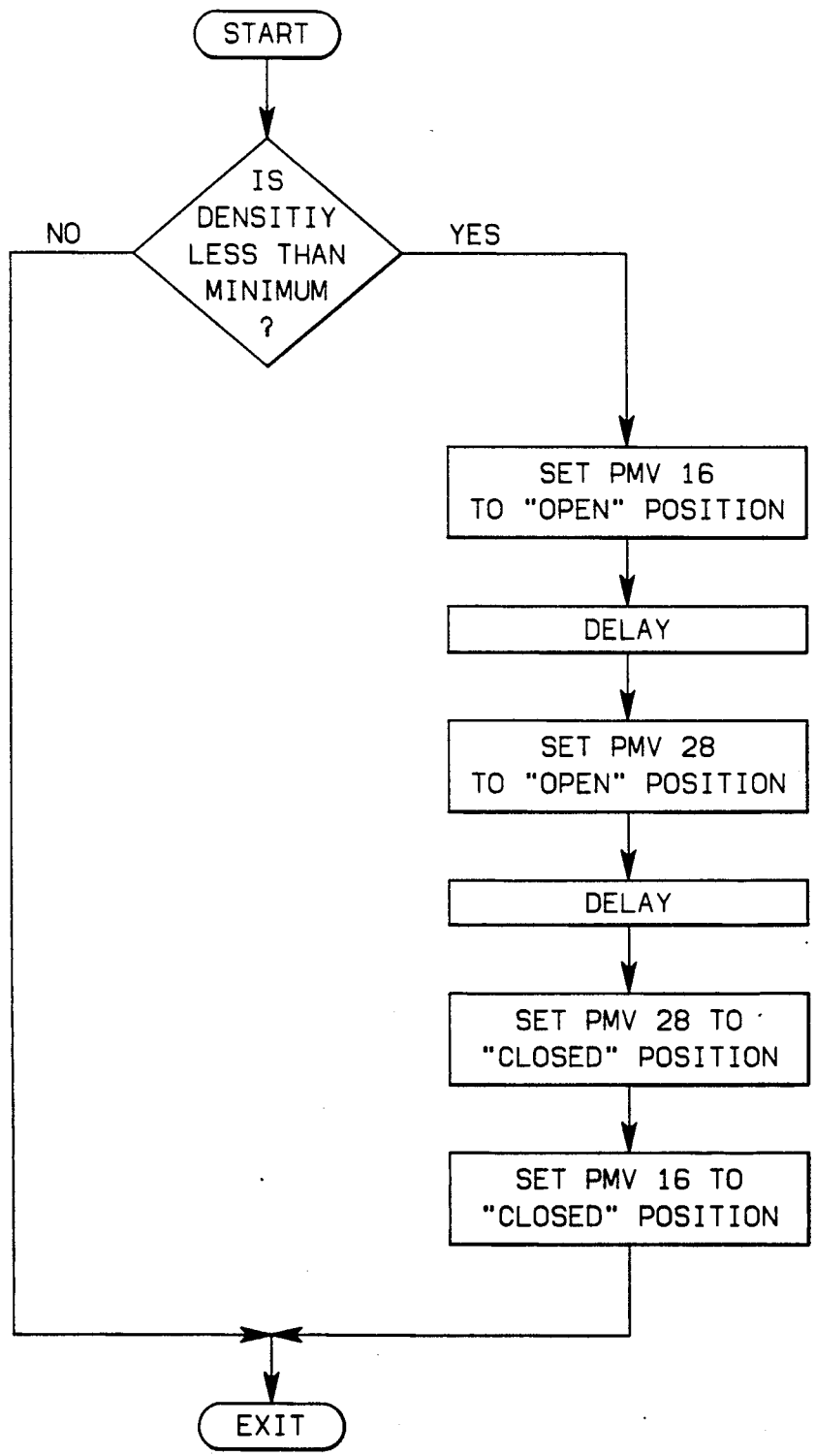
FIG. 2 is a computer flow diagram which illustrates a valve sequence utilized for flow control.

Referring now to FIG. 2 there is illustrated a computer software flow chart for the valve sequence cycle for controlling flow of concentrated catalyst slurry from the mud tank 10 to the mix tank 20. The software routine illustrated in FIG. 2 may be repeated as often as desired. The first step to be performed is to make a determination as to whether the actual density of the dilute catalyst slurry in mixing tank 20 is less than a desired minimum dilute catalyst density. If the actual dilute catalyst slurry density is less than the desired minimum dilute catalyst density, PMV valve 16 is opened. This is accomplished by activating control signal 80.

Next an appropriate delay is inserted to allow sufficient time for the concentrated catalyst slurry from mud tank 10 to fill the cylinder volume chamber in PMV 16. An appropriate delay will generally be known for a particular piston valve and particular density of the concentrated catalyst slurry in mud tank 10.

After the delay, PMV 28 is opened to cause a quantity of carrier fluid to flush the concentrated catalyst through PMV 16 into mix tank 20. This is accomplished by activating control signal 82.

Another appropriate delay is inserted to allow the concentrated catalyst slurry and carrier fluid to pass into mix tank 20.

Then PMV 28 is closed by deactivating signal 82, and PMV 16 is closed by deactivating signal 80 in preparation for the next cycle.

The invention has been described in terms of a preferred embodiment as illustrated in FIGS. 1 and 2. Flow transducers and flow sensors which may be utilized to measure the flow rate of the dilute catalyst slurry through conduit 60 are illustrated and described at length in Perry's Chemical Engineers Handbook, 5th Edition, Chapter 22, McGraw-Hill.

For reasons of brevity and clarity, conventional auxiliary equipment such as pumps, additional valves, and other process equipment have not been included in the above description as they play no part in the explanation of the invention, also additional measurement and control devices which would typically be used on a polymerization process have not been illustrated.

While the invention has been described in terms of presently preferred embodiment, reasonable variations and modifications are possible by those skilled in the art and such variations are within the scope of the described invention and the appended claims.

That which is claimed is:

1. An apparatus comprising:
   a storage tank for storing a concentrated slurry of particulate solid material and a liquid;
   a mixing tank;
   means for passing said concentrated slurry from said storage tank to said mixing tank;
   means for introducing an additional quantity of liquid into said mixing tank through a supply conduit;
   means for mixing said concentrated slurry and said additional quantity of liquid to form a dilute slurry of said particulate solid material and said liquid in said mixing tank;
   means for withdrawing said dilute slurry in an effluent stream from said mixing tank and for providing said effluent stream as a feed stream;
   density detector means for establishing a first signal which is representative of the actual density of said dilute slurry in said mixing tank;
   flow rate detector means for establishing a second signal which is representative of the actual flow rate of said effluent stream;
   manual means for establishing a third signal which is representative of the density of said particulate solid material;
   manual means for establishing a fourth signal which is representative of the density of said liquid;
   first computer means responsive to said first, second, third and fourth signals for calculating a fifth signal which is representative of the flow rate of said particulate solid material contained in said effluent stream; and
   catalyst controller means comprising a process controller operatively connected to a control valve for manipulating the flow rate of said effluent stream in response to said fifth signal.

2. The apparatus in accordance with claim 1, wherein said catalyst controller means for manipulating the flow rate of said effluent stream in response to said fifth signal further comprises:
   dividing means for establishing a sixth signal which is representative of a desired flow rate of said particulate solid material in said effluent stream;
   first comparator means, included in said catalyst controller means, for comparing said fifth signal and said sixth signal and for establishing a seventh signal which is responsive to the difference between said fifth signal and said sixth signal, wherein said seventh signal is scaled so as to be representative of the flow rate of said effluent stream required to maintain said fifth signal substantially equal to said sixth signal;
   a flow controller having a set point input, said flow controller being operatively connected to a control valve for controlling the flow rate of said effluent stream by means responsive to said seventh signal.

3. The apparatus in accordance with claim 2 wherein said first computer means for calculating said fifth signal comprises:
   means responsive to said first, third and fourth signals for establishing an eighth signal which is representative of the volume percent of particulate solid material in said dilute slurry; and
   multiplying means for multiplying said eight signal and said second signal to establish said fifth signal.

4. The apparatus in accordance with claim 3 wherein said dividing means for establishing said sixth signal comprises:
   manual means for establishing a ninth signal which is representative of a desired mass flow rate of particulate solid material in said effluent stream whereby said ninth signal is divided by said third signal to establish said sixth signal.

5. The apparatus in accordance with claim 1 wherein said means for passing said concentrated slurry from said storage tank to said mixing tank comprises:
- conduit means for connecting said storage tank and said mixing tank;
- first valve means operably located in said conduit means for controlling flow through said conduit means, said first valve means having first, second and third ports and having an open position and a closed position;
- timer sequence means for establishing a first digital type control signal and a second digital type control signal responsive to said first signal;
- second valve means, responsive to said first digital type control signal, for selectively actuating said first valve means between said open position and said closed position;
- valve chamber means for receiving a fixed volume of said concentrated slurry through said first port of said first valve means when said first valve means is in said open position; and
- third valve means for flushing said fixed volume of said concentrated slurry through said second port of said first valve means and into said mixing tank, wherein said means for flushing is associated with said third port of said first valve means and further wherein said third valve means for flushing is responsive to said second digital type control signal.

6. The apparatus in accordance with claim 5 wherein said means for establishing said first digital type control signal comprises:
- manual means for establishing a tenth signal which is representative of a desired minimum density for said dilute slurry;
- second comparator means for comparing said tenth signal and said first signal and for establishing an eleventh signal which is responsive to said first signal and said tenth signal wherein said eleventh signal is a digital type signal having a first state when the density of said dilute slurry represented by said first signal is less than the minimum density represented by said tenth signal and having a second state when the density of said dilute slurry is greater than the density represented by said tenth signal, and
- second computer means for establishing a valve timer sequence responsive to said eleventh signal wherein said first digital type control signal and said second digital type control signal are generated in said timer sequence, and wherein said timer sequence is initiated when said eleventh signal makes a transition from said second state to said first state.

7. The apparatus in accordance with claim 5 additionally comprising means for stirring the contents of said mixing tank, and means for maintaining a desired level of dilute slurry in said mixing tank.

8. An apparatus comprising:
- a catalyst storage tank for storing a concentrated slurry of a solid catalyst and a liquid diluent;
- a catalyst mixing tank;
- means for passing said concentrated slurry from said catalyst storage tank to said catalyst mixing tank;
- means for introducing a stream of said liquid diluent into said catalyst mixing tank through a supply conduit;
- means for mixing said concentrated slurry and said stream of liquid diluent to form a dilute slurry of said solid catalyst and said diluent in said catalyst mixing tank;
- means for withdrawing said dilute slurry in an effluent stream from said mixing tank and for providing said effluent stream as a feed stream to a reactor;
- density detector means for establishing a first signal which is representative of the actual density of said dilute slurry in said mixing tank;
- flow rate detector means for establishing a second signal which is representative of the actual flow rate of said effluent stream;
- flow rate controller means having a set point input, said flow rate controller means being operatively connected to a control valve for controlling flow rate of said effluent stream;
- manual means for establishing a third signal which is representative of the density of said solid catalyst;
- manual means for establishing a fourth signal which is representative of the density of said liquid diluent;
- computer means responsive to said first, second, third and fourth signals for calculating a fifth signal which is representative of the flow rate of said solid catalyst contained in said effluent stream; and
- catalyst controller means for manipulating the flow rate of said effluent stream in response to said fifth signal, wherein an output signal from said catalyst controller adjusts said set point of said flow controller.

9. The apparatus in accordance with claim 8 wherein said means for manipulating the flow rate of said effluent stream in response to said fifth signal comprises:
- manual means for establishing a sixth signal which is representative of a desired flow rate of said solid catalyst in said effluent stream;
- means for comparing said fifth signal and said sixth signal and for establishing a seventh signal which is responsive to the difference between said fifth signal and said sixth signal, wherein said seventh signal is scaled so as to be representative of the flow rate of said effluent stream required to maintain said fifth signal substantially equal to said sixth signal; and
- controller means for manipulating the flow rate of said effluent stream in response to said seventh signal.

10. A method of controlling flow of particulate matter, wherein a concentrated slurry containing particulate solid matter is contained in a storage tank, said method comprising the steps of:
- passing said concentrated slurry from said storage tank to a mixing tank;
- introducing an additional quantity of liquid into said mixing tank through a supply conduit;
- mixing said concentrated slurry and said additional quantity of liquid to form a dilute slurry;
- withdrawing said dilute slurry in an effluent stream from said mixing tank and providing said effluent stream as a feed stream;
- establishing a first signal which is representative of the actual density of said dilute slurry in said mixing tank;
- establishing a second signal which is representative of the actual flow rate of said effluent stream;
- establishing a third signal and a fourth signal which are respectively representative of the density of said particulate solid material and the density of said liquid;

calculating a fifth signal, responsive to said first, second, third and fourth signals, which is representative of the flow rate of said particulate solid material contained in said effluent stream; and manipulating the flow rate of said effluent stream in response to said fifth signal.

11. A method in accordance with claim 10 wherein said particulate solid material comprises a catalyst solid material, said liquid comprises a liquid diluent, said storage tank is a catalyst storage tank and said mixing tank is a catalyst mixing tank.

12. A method in accordance with claim 11 wherein said step of manipulating the flow rate of said effluent stream in response to said fifth signal comprises the following steps:

establishing a sixth signal which is representative of a desired flow rate of said catalyst solids in said effluent stream;

comparing said fifth signal and said sixth signal and establishing a seventh signal which is responsive to the difference between said fifth signal and said sixth signal wherein said seventh signal is scaled so as the be representative of the flow rate of said effluent stream required to maintain said fifth signal substantially equal to said sixth signal; and manipulating the flow rate of said effluent stream in response to said seventh signal.

13. A method in accordance with claim 12 wherein said step of calculating a fifth signal comprises the following steps:

establishing an eighth signal, responsive to said first, third, and fourth signals, which is representative of the volume percent of solid catalysts in said dilute slurry; and multiplying said eighth signal and said second signal to establish said fifth signal.

14. A method in accordance with claim 13 wherein said step of establishing a sixth signal comprises:

establishing a ninth signal which is representative of a desired mass flow rate of solid catalyst in said effluent stream; and dividing said ninth signal by said third signal to establish said sixth signal.

15. A method in accordance with claim 11 wherein a first conduit means is provided for connecting said catalyst storage tank and said catalyst mixing tank, wherein a first piston motor valve responsive to digital type signals is operably located in said first conduit and wherein a second conduit is provided for connecting a source of liquid diluent to said first piston motor valve and wherein a second piston motor valve responsive to digital type signals, is operably located in said second conduit means, and wherein said step of passing said concentrated slurry to said mixing tank comprises the following steps:

initiating a valve timer sequence which generates said digital type signals responsive to said first signal, and wherein said valve timer sequence comprises the following sequential steps:

(a) opening said first piston motor valve responsive to said first digital signal;

(b) establishing a first delay to allow a quantity of said concentrated slurry to fill a chamber in said first piston motor valve;

(c) opening said second piston motor valve responsive to a second digital signal;

(d) establishing a second time delay to allow a quantity of said liquid diluent to flush the concentrated slurry in said chamber into said mixing tank;

(e) closing said second piston motor valve responsive to said second digital signal; and (f) closing said first piston motor valve responsive to said first digital signal.

16. A method in accordance with claim 15 wherein said step for establishing said first digital signal and said second digital signal responsive to said first signal additionally comprises the following steps:

establishing a tenth signal which is representative of a desired minimum density for said dilute slurry;

comparing said tenth signal and said first signal and for establishing an eleventh signal which is responsive to said first signal and said tenth signal wherein said eleventh signal is a digital type signal having a first state when the density of said dilute slurry represented by said first signal is less than the minimum density represented by said tenth signal, and having a second state when the density of said dilute slurry is greater than the density represented by said tenth signal;

initiating said valve timer sequence which generates said first digital signal and said second digital signal when said eleventh signal makes a transition from said second state to said first state.

17. A method in accordance with claim 16 additionally comprising the following steps:

stirring the contents of said mixing tank; and maintaining a desired level of dilute slurry in said mixing tank.

18. A method in accordance with claim 10 wherein said fifth signal is a continuously variable signal.

19. A method in accordance with claim 12 wherein said seventh signal is a continuously variable signal.

* * * * *